United States Patent [19]

Ueno et al.

[11] Patent Number: 4,503,202

[45] Date of Patent: Mar. 5, 1985

[54] METHOD FOR PRODUCING POLYBUTADIENE HAVING AN ENHANCED MECHANICAL STRENGTH

[75] Inventors: Haruo Ueno, Chiba; Hidetomo Ashitaka, Ichihara; Koichi Nakajima, Chiba, all of Japan

[73] Assignee: UBE Industries, Ltd., Chiba, Japan

[21] Appl. No.: 534,556

[22] Filed: Sep. 22, 1983

[30] Foreign Application Priority Data

Oct. 5, 1982 [JP] Japan .................................. 57-174017

[51] Int. Cl.$^3$ ................................................ C08F 4/70
[52] U.S. Cl. ..................................... 526/140; 526/136
[58] Field of Search ......................... 526/92, 140, 136

[56] References Cited

U.S. PATENT DOCUMENTS 3,778,424 12/1973 Sugiura ................................ 526/141
3,901,868 8/1975 Ueno .................................... 526/141
4,429,085 1/1984 Henderson ............................ 526/92

Primary Examiner—Paul R. Michl
Attorney, Agent, or Firm—Burgess, Ryan & Wayne

[57] ABSTRACT

Polybutadiene consisting of from 5% to 30% by weight of a boiling n-hexane-insoluble fraction and from 70% to 95% by weight of a boiling n-hexane-soluble fraction and having enhanced mechanical strength is prepared by polymerizing 1,3-butadiene in a polymerization solvent in the presence of a specific catalyst consisting essentially of (A) a cobalt compound catalytic component soluble in the polymerization solvent; (B) an organic aluminum halide catalytic component; (C) a trialkyl aluminum-water reaction product in catalytic component, and (D) a catalytic component consisting of carbon disulfide and/or phenyl isothiocyanate, and by isolating the resultant polybutadiene from the reaction mixture.

20 Claims, No Drawings

METHOD FOR PRODUCING POLYBUTADIENE HAVING AN ENHANCED MECHANICAL STRENGTH

BACKGROUND OF INVENTION

1. Field of the Invention

The present invention relates to a method for producing polybutadiene having enhanced mechanical strength. More particularly the present invention relates to a new method for producing polybutadiene with enhanced mechanical strength in a single polymerization step.

2. Description of the Prior Art

Japanese Examined Patent Publication (Kokoku) No. 49-17666 discloses a process for producing polybutadiene by cis-1,4-polymerizing at least a portion of a feed comprising 1,3-butadiene in an inert organic solvent in the presence of a cis-1,4-polymerization catalyst comprising a cobalt compound and an organic aluminum halide of the formula $AlR_nX_{3-n}$, wherein R represents an alkyl radical having 1 to 6 carbon atoms, a phenyl radical, or a cycloalkyl radical, X represents a halogen atom, and n represents a number from 1.5 to 2; then subjecting the resultant polymerization mixture to which may be added in additional amount of 1,3-butadiene and/or an additional amount of the inert organic solvent to 1,2-polymerization in the presence of a 1,2-polymerization catalyst comprising a cobalt compound, an organic aluminum compound of the formula $AlR_3$ wherein R is the same as defined above, and carbon disulfide.

The above-mentioned process comprises two polymerization steps, cis-1,4-polmerization and 1,2-polymerization and, therefore calls for two polymerization vessels and two sets of temperature-control equipment. The polymerization apparatus required here is therefore expensive, making the polymerization process too costly. Also, the above-mentioned process is disadvantageous in that the yield of polybutadiene per unit time is small.

Japanese Unexamined Patent Publication (Kokai) No. 56-88408 discloses a single step polymerization process for producing polybutadiene. In this type of process, cis-1,4-polymerization and 1,2-polymerization are carried out simultaneously. The 1,3-butadiene is polymerized in a solvent in the presence of a catalyst consisting of a solvent-soluble cobalt compound, a dialkyl aluminum halide of the formula $AlR_2X$ in an amount of from 1 to 100 moles per mole of the cobalt compond, and carbon disulfide. The polymerization mixture is controlled so that the amount of water in the mixture does not exceed 1 mole per mole of the cobalt compound. According to the disclosure of the unexamined publication, the boiling n-hexane-soluble fraction in the resultant polybutadiene has a small intrinsic viscosity of 0.4, which corresponds to a small molecular weight, and a small content of a cis-1,4-structure. The boiling n-hexane-insoluble fraction of the resultant polybutadiene also exhibits an unsatisfactory melting point of 202° C. or less, even when polymerization is carried out at a low temperature of 20° C.

SUMMARY OF THE INVENTION

An object of the present invention is to provide a method for producing polybutadiene having enhanced mechanical strength in a single step polymerization procedure in which the cis-1,4-polymerization and 1,2-polymerization of 1,3-butadiene are carried out simultaneously.

Another object of the present invention is to provide a method for producing polybutadiene comprising a boiling n-hexane-soluble fraction (cis-1,4-polybutadiene) having a large molecular weight and a large content of cis-1,4-structure and a boiling n-hexane-insoluble fraction (1,2-polybutadiene) having a high melting point and a large molecular weight and, therefore having excellent mechanical strength.

The above-mentioned objects can be attained by the method of the present invention, which comprises the step of:

polymerizing 1,3-butadiene in a polymerization solvent in the presence of a catalyst consisting essentially of (A) a cobalt catalytic component consisting of at least one cobalt compound soluble in the polymerization solvent; (B) an organic aluminum halide catalytic component consisting of at least one organic aluminum halide; (C) a catalytic component consisting of at least one reaction product of a trialkyl aluminum with water; and (D) a catalytic component consisting of at least one member selected from the group consisting of carbon disulfide and phenyl isothiocyanate, to produce polybutadiene consisting of from 5% to 30% by weight of a boiling n-hexane-insoluble fraction and from 70% to 95% by weight of a boiling n-hexane-soluble fraction thereof; and isolating the resultant polybutadiene from the polymerization mixture.

DESCRIPTION OF THE PREFERRED EMBODIMENTS

The method of the present invention comprises the steps of polymerizing 1,3-butadiene in a polymerization solvent in the presence of a specific catalyst and isolating the resultant polybutadiene from the polymerization mixture. The resultant polybutadiene consists of from 5% to 30% by weight of a boiling n-hexane-insoluble fraction which corresponds to 1,2-polybutadiene and 70% to 95% by weight of a boiling n-hexane-soluble fraction which corresponds to cis-1,4-polybutadiene.

The polymerization procedure in accordance with the method of the present invention is carried out in a polymerization solvent which is capable of dissolving therein the boiling n-hexane-soluble fraction (cis-1,4-polybutadiene fraction) in the resultant polybutadiene. The polymerization solvent consists essentially of at least one liquid compound capable of dissolving therein the boiling n-hexane-soluble fraction, and preferably selected from, aromatic hydrocarbons, for example, benzene, toluene, and xylene; aliphatic hydrocarbons, for example, n-heptane and h-hexane; cycloaliphatic hydrocarbons, for example, cyclohexane; and halogenated compounds of the above-mentioned hydrocarbons, for example, monochlorobenzene, o-dichlorobenzene, dichloromethane, 1,2-dichloroethane, and 1,1,2-trichloroethane. A preferable hydrocarbon is benzene.

When the catalyst contains a dialkylaluminum halide, it is preferable that the polymerization solvent contain a small amount of water. In this case, the concentration of water in the polymerization mixture preferably be 50 mg/l or less, more preferably, from 10 to 50 mg/l.

In the method of the present invention, the catalyst consists essentially of (A) a cobalt catalytic component consisting of at least one cobalt compound soluble in the polymerization solvent; (B) an organic aluminum halide catalytic component consisting of at least one organic aluminum halide; (C) another catalytic component consisting of at least one reactin product of a trialkyl aluminum with water; and (D) still another catalytic component consisting of at least one member selected from the group consisting of carbon disulfide and phenly isothiocyanate.

The cobalt catalytic component (A) consists of at least one cobalt component compound which is not limited to a specific type of compound as long as it is soluble in the polymerization solvent.

For example, the cobalt compound may be selected from a group consisting of cobalt complexes with β-diketones of the formula:

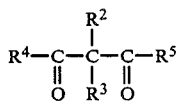

wherein $R^2$ and $R^3$ represent at least one member selected from the group consisting of a hydrogen atom and aliphatic hydrocarbon radicals having 1 to 3 carbon atoms, respectively, and $R^4$ and $R^5$ represent an aliphatic hydrocarbon radical having 1 to 3 carbon atoms, respectively; cobalt complexes with β-keto acid esters of the formula

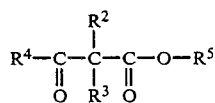

wherein $R^1$, $R^2$, $R^3$, and $R^4$ are as defined in preceding formula (II); cobalt salts of organic carboxylic acids having 6 or more carbon atoms; cobalt halide complexes of the formula

CoX$n'$.Y$m$ wherein X represents a halogen atom as defined above preferably, a chlorine atom, n' represents an integer of 2 or 3, Y represents an organic ligand capable of forming a complex in coordination with the cobalt halide (CoXn), m represent an integer of from 1 to 4; and cobalt complexes coordinated with an olefin or diene.

Preferable examples of the cobalt-β-diketone complexes are cobalt (II) acetylacetonate and cobalt (III) acetyl-acetonate. A preferable example of the cobalt-β-keto acid ester is cobalt ethyl acetoacetate complex. The cobalt salts of the organic carboxylic acids are preferably selected from a group consisting of cobalt octoate, cobalt naphthenate and cobalt benzoate.

In the cobalt halide complexes of the formula CoXn'.Ym usable for the present invention, it is preferable that X represents a chlorine atom, and the organic ligand Y be selected from a group consisting of amine compounds, for example, pyridine, thriethylamine, tributylamine and dimethylaniline; alcohol compounds, for instance, methyl alcohol and ethyl alcohol and; N,N-dialkylamide compounds, for instance, N,N-dimethylformamide, N,N-dimethylacetamide, and N,N-diethylformamide. Especially, it is preferable that the cobalt halide complex be a cobalt chloride-pyridine complex or a cobalt chloride-ethylalcohol complex.

An example of the cobalt complex coordinated with a diene such as 1,3-butadiene is (1,3-butadiene) [1-(2-methyl-3-butenyl)-π-allyl] cobalt. Also, a cobalt-1,3-butadiene complex which is prepared in accordance with a method disclosed by Japanese unexamined Patent Publication (Kokai) No. 57-125206 wherein a cobalt compound is reacted with a trialkylaluminum in an inert organic solvent which may be of the same type as that of the polymerization solvent, in the presence of 1,3-butadiene. The resultant reaction mixture containing the resultant cobalt-1,3-butadiene complex can be used for the preparation of the catalyst in accordance with an In Situ method.

The aluminium catalytic component (B) usable for the present invention consists of at least one organic aluminum halide which may be of the formula (I):

$$AlR_nX_{3-n} \qquad (I)$$

wherein R represents a member selected from the group consisting of alkyl radicals having 1 to 6 carbon atoms, a phenyl radical, and cycloalkyl radicals having 5 to 7 carbon atoms, X represents a halogen atom, and n represents a number from 1.5 to 2.0.

The organic aluminum halide compound of the formula (I) is preferably selected from the group consisting of dialkyl aluminum halides, for example, diethyl aluminum monochloride, dietyl aluminum monobromide, and diisobutyl aluminum monochloride, and alkyl aluminum sesquihalides, for example, ethyl aluminum sesquichloride.

The catalytic component (C) consists of at least one reaction product of a trialkyl aluminum with water. The trialkyl aluminum is of the formula (II):

$$AlR^1_3 \qquad (II)$$

wherein $R^1$ represents a member selected from the group consisting of alkyl radicals having 1 to 6 carbon atoms and cycloalkyl radicals having 5 to 7 carbon atoms.

The trialkyl aluminums usable for the present invention include trimethyl aluminum, triethyl aluminum, tri-n-propyl aluminum, tri-n-butyl aluminum, tri-isobutyl aluminum, tri-n-hexyl aluminum, and tricyclohexyl aluminum.

The reaction of the trialkyl aluminum with water is carried out by dropwisely adding water to a solution of the trialkyl aluminum dissolved in an inert organic solvent, which may be the same as or different from the polymerization solvent, in the presence or absence of 1,3-butadiene, while the solution is stirred. In another manner, a solution of water dissolved in the inert organic solvent is added to the trialkyl aluminum solution, and then the mixture is stirred from about 0.1 to about 30 minutes.

In the preparation of the reaction product, the molar ratio of trialkyl aluminum to water is preferably in the range of from 0.5:1 to 1:1. Also, it is preferable that the trialkyl aluminum in the inert organic solvent be in the amount of from 0.1 to 2 molels per liter of the inert organic solvent.

The trialkyl aluminum-water reaction product is obtained and used in the form of a solution thereof in a inert organic solvent.

The catalytic component (D) consists of at least one sulfur compound selected from carbon disulfide ($CS_2$) and phenyl isothiocyanate ($C_6H_5.NCS$).

In the preparation of the catalyst, it is preferable that per mole of 1,3-butadiene, the amount of the cobalt catalytic component (A) be 0.01 millimole or more, more preferably, from 0.03 to 0.2 millimoles, and the amount of the aluminum catalytic component (B) be 0.5 millimoles or more, more preferably 1 millimole, still more preferably, from 2 to 10 millimoles.

The molar ratio (Al/Co) of the aluminum catalytic component (B) to the cobalt catalytic component (A) is preferably 5:1 or more, more preferably, 15:1 or more, still more preferably, from 25:1 to 500:1.

Also, in the catalyst, it is preferably that per mole of 1,3-butadiene, the amount of the trialkyl aluminum-water reaction product catalytic component (C) be 0.5 millimoles or more, more preferably, 1 millimole or more, still more preferably, from 1 to 10 millimoles, in terms of trialkyl aluminum, and the amount of the sulfur catalytic component (D) be in the range of from 0.00001 to 0.01 mole, more preferably, from 0.05 to 10 millimoles.

In the catalyst, it is also preferably that the amount of the aluminum catalytic component (B) be in the range of from 5 to 500 moles, more preferable from 25 to 500 moles; the amount of the trialkyl aluminum-water reaction product catalytic component (C) be in the range of from 5 to 300 moles, more preferably from 10 to 100 moles; and the amount of the sulfur catalytic component (D) be in the range of from 0.1 to 100 moles, more preferably from 1 to 500 moles, each per mole of the cobalt catalytic component (A).

In the preparation of the catalyst, the catalytic components (A), (B), (C), and (D) can be mixed with each other in any sequence. For example, it is preferable that a solution of 1,3-butadiene dissolved in a polymerization solvent be added with an aluminum catalytic component (B), thereafter with a trialkyl aluminum-water reaction product catalytic component (C), then with a cobalt catalytic component (A) and, finally, with a sulfur catalytic component (D).

The catalyst produced in the above-mentioned manner is effective for producing a polybutadiene in which a boiling n-hexane-insoluble fraction thereof is contained in a large content and a boiling n-hexane-soluble fraction thereof has a large content of a cis-1,4-structure. This type of polybutadiene exhibits enhanced mechanical strength.

In the method of the present invention, the polymerization procedure is carried out preferably at a temperature of from −20° C. to 80° C., more preferably, from 20° C. to 70° C., under atmospheric pressure or an increased pressure for 10 minutes to 5 hours.

In the polymerization procedure, the initial concentration of 1,3-butadiene in the polymerization mixture is preferably in the range of from 5% to 40% based on the entire weight of the polymerization mixture.

According to the method of the present invention, the resultant polybutadiene consists of 5% to 30% by weight of a boiling n-hexane-insoluble fraction (1,2-structure) and 70% to 95% by weight of a boiling n-hexane-soluble fraction (cis-1,4-structure) thereof, therefore, can be converted to a vulcanized article having enhanced mechanical strength in addition to the same properties as those of the cis-1,4-polybutadiene article.

In the method of the present invention, the content of the boiling n-hexane-insoluble fraction in the resultant polybutadiene can be controlled by controlling the amounts of the aluminum catalytic component (B), the trialkyl aluminum-water reaction product catalytic component (C), and the sulfur catalytic component (D), and the molar ratio of trialkyl aluminum to water.

In the resultant polybutadiene, it is preferable that the boiling n-hexane-insoluble fraction have an intrinsic viscosity $[\eta]$ of from 0.5 to 5.0, more preferably, from 1.0 to 5.0, determined in tetrahydronaphthalene at a temperature of 135° C., a content of a 1,2-structure of 85% or more, and a melting point of from 200° to 220° C. Also, it is preferable that the boiling n-hexane-soluble fraction of the resultant polybutadiene have an intrinsic viscosity $[\eta]$ of from 1.0 to 3.0, more preferably from 1.8 to 2.5, determined in toluene at a temperature of 30° C., and a content of cis-1,4-structure of 90% or more.

In order to control the intrinsic viscosity of the boiling n-hexane-soluble fraction to a desired value, a known molecular weight modefier, for example, cyclooctadiene (COD) or an α-olefin compound may be added in an effective amount to the polymerization mixture.

The method of the present invention can be modified, if necessary, so that a portion of 1,3-butadiene in a polymerization mixture is first polymerized in a polymerization solvent in the presence of a cis-1,4-polymerization catalyst consisting essentially of a polymerization solvent-soluble cobalt compound and an organic aluminum halide to produce cis-1,4-polybutadiene and, a remaining amount of 1,3-butadiene is then polymerized in the presence of the cis-1,4-polybutadiene in accordance with the method of the present invention. In the above-method two-step polymerization process, it is necessary to increase the content of the boiling n-hexane-soluble fraction produced in the second step to a value larger than that obtained in the single-step polymerization process.

When the two step-polymerization process is used, the yield of the resultant polybutadiene in each second polymerization vessel significantly increases. Therefore, the sum of the yields of the first cis-1,4-polymerization product and the second polymerization product increases.

When the polymerization procedure is terminated, the polymerization reaction may be shortstopped by adding a polymerization shortstopper together with a stabilizer to the polymerization mixture.

The polymerization shortstopper is not limited to a specific type of compound as long as it can be reacted with the aluminum catalytic component so as to deactivate it. Usually, the shortstopper consists of at least one member selected from aliphatic alcohols, for example, methyl alcohol and ethyl alcohol; water; inorganic acids, for example, hydrochloric acid and sulfuric acid; organic acids, for example, acetic acid and benzoic acid; monoethanolamine, ammonia; phosphorous esters, for example, tris (nonylphenyl) phosphite; and hydrogen chloride gas. The shortstopper may be in the form of an aqueous solution or an alcoholic solution.

Usually, the shortstopping operation is carried out by adding a large amount of a polar solvent, for example, aliphatic alcohol or water to the polymerization mixture; by mixing the polymerization mixture into a large amount of a polar solvent; by adding a small amount of a solution of the above-mentioned inorganic acid, organic acid, monomethanolamine or ammonia in a polar solvent into the polymerization mixture; or by introducing a hydroegen chloride gas into the polymerization mixture.

The stabilizer consists usually of 2,6-di-tert-butyl-4-methyl phenol or 2,2'-methylene-bis(4-methyl-6-tert-butyl phenol), and is used in a concentration of 0.5% to 2%.

The shortstopped polymerization mixture is subjected to a step for isolating the resulting polybutadiene therefrom. The isolation can be effected by adding a precipitating agent, for example, methyl alcohol to the polymerization mixture or by evaporating volatile substances from the polymerization mixture while blowing or not blowing steam into the polymerization mixture. The precipitated polybutadiene is separated from the polymerization mixture, washed with methyl alcohol or hot water and then dried.

The polybutadiene obtained in accordance with the method of the present invention may be mixed with known additives usable for conventional natural rubber and high cis-1,4-polybutadiene. Also, the polybutadiene produced by the method of the present invention may be blended with natural rubber and/or another synthetic rubber material.

In the polybutadiene obtained by the method of the present invention, the boiling n-hexane-soluble fraction (cis-1,4-polybutadiene fraction) has a high molecular weight and a large content of a cis-1,4-structure of, for example, 90% or more and the boiling n-hexane-insoluble fraction (1,2-polybutadiene) has a high melting point of, for example, 200° C. or more, a high molecular weight, and a large content of a 1,2-structure of, for example, 85% or more. Therefore, the polybutadiene produced by the method of the present invention exhibits excellent mechanical strength.

SPECIFIC EXAMPLES

The present invention will be further explained in the following examples. In the examples, the amount of the boiling n-hexane-insoluble fraction of the resultant polybutadiene was determined by immersing 2 g of the polybutadiene in 200 ml of n-hexane at room temperature, by removing the n-hexane-soluble fraction by means of filtration, by extracting the n-hexane-insoluble fraction at a boiling point of n-hexane by using a Soxhlet's extractor for 4 hours, by separating the non-extracted fraction from n-hexane, by drying it under vacuum and, finally, measuring the weight of the dried fraction.

The amount of the boiling n-hexane-soluble fraction of the polybutadiene was determined by subjecting the resultant extracted solution from the above-mentioned extraction procedure to an evaporation procedure in which n-hexane was evaporated from the solution, drying the residual fraction under vacuum, then measuring the weight of the dried fraction.

The content of the cis-1,4-structure in the boiling n-hexane-soluble fraction in the polybutadiene was determined by means of infrared absorption spectrum analysis (IR).

The content of the 1,2-structure in the boiling n-hexane-insoluble fraction of the polybutadiene was determined by means of nuclear magnetic resonance spectrum (NMR).

The melting point of the boiling n-hexane-insoluble fraction of the polybutadiene was determined from a temperature at a peak point appearing in an endothermic curve of the boiling n-hexane-insoluble fraction measured by a recording differential scanning calorimeter (DSC).

The intrinsic viscosities $[\eta]$ of the boiling n-hexane-soluble fraction of the polybuadiene was determined in toluene at a temperature of 30° C.

The intrinsic viscosity of the boiling n-hexane-insoluble fraction of the polybutadiene was determined in tetrahydronaphthalene at a temperature of 135° C.

EXAMPLE 1

A solution of 85 g of dried 1,3-butadiene dissolved in 860 ml of anhydrous benzene (which solution contained 1.5 millimoles of water) was placed in a separable flask having a capacity of 2 liters and equipped with a stirrer, a thermometer, and an inlet for introducing therein nitrogen gas. Nitrogen gas was blown into the flask through the inlet to replace air therewith.

The 1,3-butadiene-benzene solution was mixed with 4.0 millimoles of diethylaluminum monochloride, with 7.4 ml of a solution of 4 millimoles, in terms of aluminum, of a reaction product of water with triethyl aluminum in a molar ratio ($H_2O$/$AlEt_3$) of 0.87:1, with 0.043 millimoles of cobalt octoate and finally with 0.13 millimoles of carbon disulfide in the above-mentioned sequence, while the temperature of the solution is maintained at 40° C. The resultant mixture was subjected to a polymerization procedure at a temperature of 40° C. for 30 minutes.

When the polymerization procedure was terminated, one liter of methyl alcohol containing small amounts of 2,6-di-tert-butyl-4-methylphenol and hydrochloric acid was added to the resultant polymerization mixture to shortstop the polymerization reaction and to stabilize the resultant polymerization mixture. The precipitated polymer was separated from the polymerization mixture by means of filtration. The separated polymer was dried at a temperature of about 20° C. under a reduced pressure. A resultant polybutadiene was obtained in an amount of 37.1 g. The resultant polybutadiene contained 12.7% by weight of a boiling n-hexane-insoluble fraction having a content of a 1,2 structure of 93,5%, a melting point of 205° C., and an intrinsic viscosity $[\eta]$ of 2.9, and the balance of a boiling n-hexane-soluble fraction having a content of a cis-1,4-structure of 96.8% and an intrinsic viscosity $[\eta]$ of 2.60 determined in toluene at a temperature of 30° C.

EXAMPLES 2 THROUGH 4

In each of Examples 2 through 4, the same procedure as that described in example 1 was carried out except that the amount and the molar ratio ($H_2O$/$AlEt_3$) of the reaction product of water with triethyl aluminum were varied as indicated in Table 1. The results are shown in Table 1.

EXAMPLE 5

The same procedure as that described in Example 1 was carried out except that the amount and the molar ratio ($H_2O$/$AlEt_3$) of the reaction product of water with triethyl aluminum was changed in Table 1 and cobalt octoate was replaced by a cobalt-butadiene complex prepared by the following In Situ method. The cobalt-butadiene complex was prepared in such a manner that a 200 ml triangle flask equipped with a three-way cock was charged with 50 ml of a solution of 10% by weight of 1,3-butadiene dissolved in benzene, and the solution was added to 1.5 millimoles of cobalt octoate in the form of a benzene solution and 1.6 millimoles of triethyl aluminum in the form of a benzene solution at room temperature while the mixture is stirred. The results are shown in Table 1.

EXAMPLE 6

The same procedure as that described in Example 1 was carried out except that carbon disulfide was added to the 1,3-butadiene-benzene solution before diethylaluminum monochloride was added thereto.

The results are indicated in Table 1.

EXAMPLE 7

The same procedure as that described in Example 1 was carried out except that carbon disulfide was replaced by phenyl isothiocyanate in an amount of 1.5 millimoles. The results are indicated in Table 1.

TABLE 1

| Example No. | Molar Ratio ($H_2O/AlE_3$) | Amount, in terms of aluminum, of $H_2O$—$AlEt_3$ reaction product (m mole) | Polybutadiene Boiling n-hexane-insoluble fraction Yield (g) | Content (%) | Intrinsic Viscosity | Melting point (°C.) | Boiling n-hexane-soluble fraction Intrinsic Viscosity | Content of microstructure (%) Cis-structure | Vinyl-structure | Trans-structure |
|---|---|---|---|---|---|---|---|---|---|---|
| 2 | 0.91 | 7 | 20.1 | 19.6 | 3.30 | 205 | 1.59 | 95.4 | 2.8 | 1.8 |
| 3 | 0.91 | 5.5 | 43.5 | 8.0 | 3.20 | 204 | 2.36 | 96.3 | 2.1 | 1.6 |
| 4 | 0.95 | 4 | 41.0 | 5.7 | 2.95 | 204 | 2.71 | 96.8 | 1.9 | 1.3 |
| 5 | 0.90 | 4 | 18.6 | 18.9 | 3.46 | 204 | 1.90 | 96.7 | 2.2 | 1.6 |
| 6 | 0.87 | 4 | 39.5 | 9.8 | 2.82 | 204 | 2.67 | 96.9 | 1.9 | 1.2 |
| 7* | 0.87 | 4 | 36.5 | 5.2 | 2.20 | 204 | 2.72 | 97.1 | 1.7 | 1.2 |

Note
*Phenyl isothiocyanate was used.

EXAMPLE 8

In Example 8, the polybutadiene rubber produced in Example 6 was converted into a composition as indicated in Table 2.

TABLE 2

| Component | Amount (part by weight) |
|---|---|
| Polybutadiene rubber | 100 |
| HAF Carbon (*) | 50 |
| Naphthene type process oil | 10 |
| Zinc oxide | 5 |
| Stearic acid | 2 |
| Amine type antioxidant | 1 |
| Cyclohexyl-benzothiazyl sulfenamide | 1 |
| Sulfur | 1.5 |

Note:
(*) Oil absorption: 80 g per 100 g of the carbon
Surface area: 85 m² per g of the carbon particles The composition was uniformly mixed by using a Brabender plastograph having a capacity of 60 ml and, then, by using a roll mixer, and vulcanized at a temperature of 140° C. for 30 minutes. The vulcanizing procedure was applied to a portion of the composition which was subjected to the measurement of a flex-crack resistance of the vulcanized composition, at 140° C. for 75 minutes. The properties of the vulcanized composition was determined in accordance with Japanese Industrial Standard K-6301.

For the purpose of comparison, the same procedures as those mentioned above were carried out, except that the polybutadiene rubber was replaced by a commercially available high cis-1,4-polybutadiene.

The properties of the vulcanized composition of the present example and the comparative vulcanized composition are indicated in Table 3.

TABLE 3

| Item | Example 8 | Comparative Composition |
|---|---|---|
| Hardness | 69 | 58 |
| 300% modulus (kg/cm²) | 140 | 80 |
| Ultimate elongation (%) | 420 | 540 |
| Tensile strength (kg/cm²) | 185 | 194 |
| Tear strength (kg/cm²) (*)₁ | 57 | 48 |
| Flex-crack resistance (*)₂ | >300,000 | 3,000 |

Note:
(*)₁ The tear strength was measured in accordance with B-type test method described in JIS K-6301.
(*)₂ The flex-crack resistance was represented by the number of flexing operations at which the length of a crack created in a testing specimen reached from 2 mm to 15 mm.

We claim:

1. A method for producing polybutadiene having enhanced mechanical strength, comprising the steps of:
polymerizing 1,3-butadiene is a polymerization solvent in the presence of a catalyst consisting essentially of (A) a cobalt catalytic component consisting of at least one cobalt compound soluble in said polymerization solvent; (B) an organic aluminum halide catalytic component consisting of at least one organic aluminum halide; (C) a catalyst component consisting of at least one reaction product of a trialkyl aluminum with water; and (D) a catalytic component consisting of at least one member selected from the group consisting of carbon disulfide and phenyl isothiocyanate, to produce polybutadiene consisting of from 5% to 30% by weight of a boiling n-hexane-insoluble fraction and from 70% to 95% by weight of a boiling n-hexane-soluble fraction thereof; and
isolating the resultant polybutadiene from the polymerization mixture.

2. The method as set forth in claim 1, wherein said cobalt compound is selected from the group consisting of cobalt-β-diketone complexes, cobalt-β-ketoacid ester complexes, cobalt salts of organic carboxylic acids having 6 or more carbon atoms, cobalt halide complexes, and cobalt complexes consisting of a cobalt atom coordinated with a member selected from the olefins and diolefins.

3. The method as set forth in claim 1, wherein said organic aluminum halide has the formula (I):

$$AlR_nX_{3-n} \qquad (I)$$

wherein R represents a member selected from the group consisting of alkyl radicals having 1 to 6 carbon atoms, a phenyl radical and cycloalkyl radicals having from 5 to 7 carbon atoms, X represents a halogen atom, and n represents the number 1.5 to 2.0.

4. The method as set forth in claim 1, wherein said trialkyl aluminum has the formula (II):

ti AlR$^1_3$ wherein R$^1$ represents a member selected from the group consisting of alkyl radicals having from 1 to 6 carbon atoms and cycloalkyl radicals having from 5 to 7 carbon atoms.

5. The method as set forth in claim 1, wherein said reaction product of trialkyl aluminum with water is produced in a molar ratio of trialkyl aluminum to water of from 0.5:1 to 1:1.

6. The method as set forth in claim 1, wherein said reaction product of trialkyl aluminum with water is proudced in an inert organic solvent.

7. The method as set forth in claim 6, wherein trialkyl aluminum is used in an amount of from 0.1 to 2 millimoles per liter of said inert organic solvent.

8. The method as set forth in claim 6, wherein siad inert organic solvent consists essentially of at least one member selected from the group consisting of aromatic hydrocarbons, aliphatic hydrocarbons, cycloaliphatic hydrocarbons and halogenated compounds of the above-mentioned hydrocarbons.

9. The method as set forth in claim 1, wherein said polymerization solvent consists essentially of at least one member selected from the group consisting of aromatic hydrocarbons, aliphatic hydrocarbons, cycloaliphatic hydrocarbons, and halogenated compounds of the above-mentioned hydrocarbons, which are capable of dissolving said boiling n-hexane-soluble fraction of the resultant polybutadiene.

10. The method as set forth in claim 1, wherein said polymerization solvent contains water in an amount of 50 mg/l or less.

11. The method as set forth in claim 1, wherein said cobalt catalytic compound (A) is used in an amount of at least 0.01 millimole per mole of 1,3-butadiene.

12. The method as set forth in claim 1, wherein said organic aluminum halide component (B) is used in an amount of at least 0.5 millimoles per mole of 1,3-butadiene.

13. The method as set forth in claim 1, wherein the molar ratio of said cobalt catalytic component (A) to said organic aluminum halide catalytic component (B) is 5 or more.

14. The method as set forth in claim 1, wherein said catalytic component (C) is used in amount of 0.5 millimoles or more, in terms of trialkyl aluminum, per mole of 1,3-butadiene.

15. The method as set forth in claim 1, wherein said catalytic component (D) is used in an amount of from 0.00001 to 0.01 moles per mole of 1,3-butadiene.

16. The method as set forth in claim 1, wherein said catalyst comprises from 10 to 500 moles of said catalytic component (B), from 5 to 300 moles, in terms of said trialkyl aluminum, of said catalytic component (C), and from 0.1 to 500 moles of said catalytic component (D), per mole of said catalytic component (A).

17. The method as set forth in claim 1, wherein said polymerizing step is carried out at a temperature of from $-20°$ C. to $80°$ C.

18. The method as claimed in claim 1, wherein 1,3-butadiene is used in a concentration of from 5% to 40%, based on the entire weight of the polymerization mixture.

19. The method as set forth in claim 1, wherein said boiling n-hexane-insoluble fraction of said resultant polybutadiene has an intrinsic viscosity of from 0.5 to 5, as determined in tetrahydronaphthalene at a temperature of 135° C., a content of a 1,2-structure of 85% or more, and a melting point of from 200° C. to 220° C.

20. The method as set forth in claim 1, wherein said boiling n-hexane-soluble fraction of the resultant polybutadiene has an intrinsic viscosity of from 1 to 3, as determined in toluene at a temperature of 30° C., and a content of a cis-1,4-structure of 90% or more.

* * * * *